United States Patent [19]

Faust

[11] Patent Number: 4,867,198

[45] Date of Patent: Sep. 19, 1989

[54] ADJUSTABLE FLOW REGULATING VALVE

[76] Inventor: Bobby G. Faust, 139 Ishmeal, Houston, Tex. 77076

[21] Appl. No.: 255,848

[22] Filed: Oct. 11, 1988

[51] Int. Cl.[4] .............................................. G05D 7/01
[52] U.S. Cl. .................................... 137/503; 137/504; 138/45
[58] Field of Search .................... 137/503, 504; 138/45

[56] References Cited

U.S. PATENT DOCUMENTS

| | | | |
|---|---|---|---|
| 2,936,788 | 5/1960 | Dahl | 138/45 |
| 3,050,086 | 8/1962 | Honsinger | 138/45 |
| 3,409,050 | 11/1968 | Weese | 138/45 |
| 3,630,236 | 12/1971 | Diggs | 138/45 |
| 4,648,424 | 3/1987 | Takahashi | 137/504 |

Primary Examiner—Robert G. Nilson
Attorney, Agent, or Firm—Neal J. Mosely

[57] ABSTRACT

An adjustable flow regulating valve has a flexible apertured diaphragm which coacts with a fixed conical needle to provide a gradually variable effective flow controlling orifice area to compensate for changes in a supply fluid pressure. As the supply fluid pressure changes, the aperture of the flexible diaphragm moves relative to the apex of the needle to reduce or increase the effective orifice area which determines the regulative flow rate. The position of the diaphragm aperture relative to the needle is manually adjustable by rotating an adjustment collar on the valve housing to vary the amount of movement of the diaphragm required to engage the aperture with the valve needle. The diaphragm may also be carried by a spring balanced inner sleeve which allows relative sliding movement between the flexible diaphragm and the needle. The amount of force required for engagement is determined by the strength of compression springs at each end of the sliding sleeve set by the adjustment collar. Varying the spring resistance varies the amount of pressure required to engage the tapered surface with the diaphragm aperture.

20 Claims, 1 Drawing Sheet

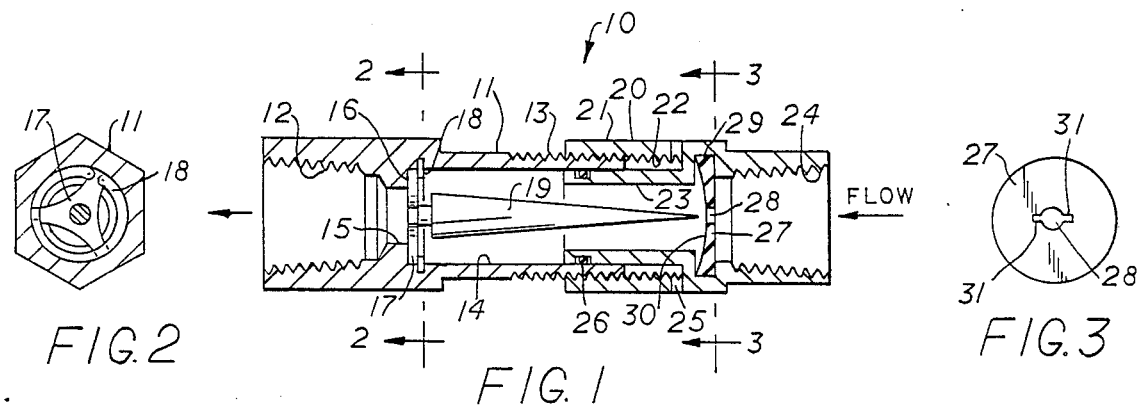
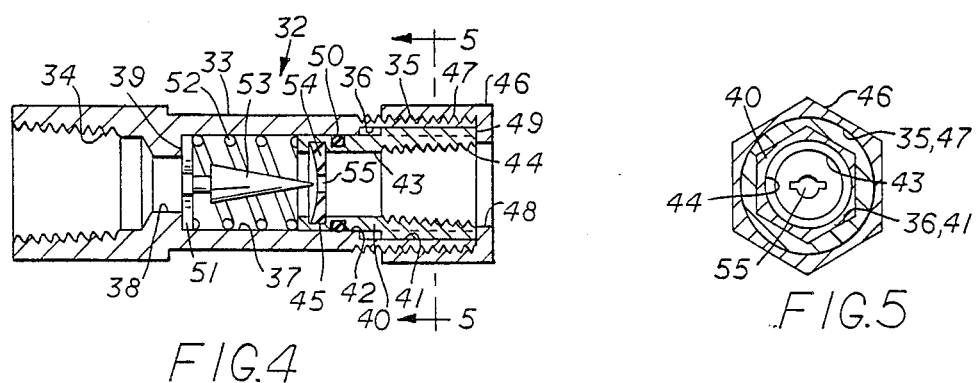
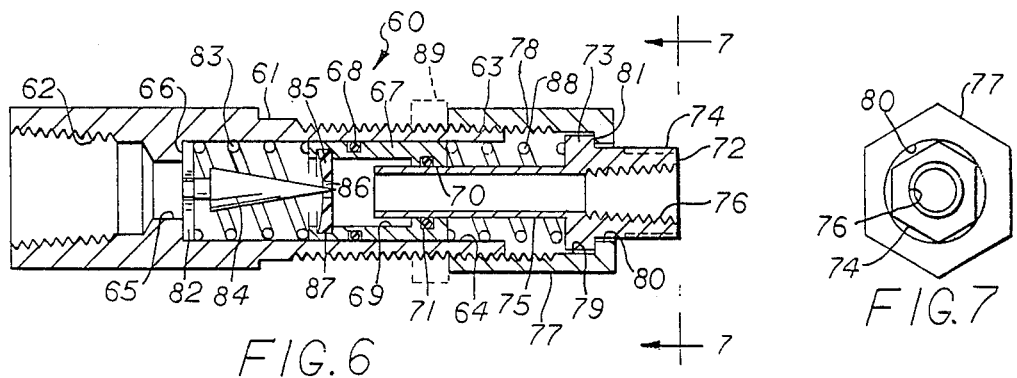
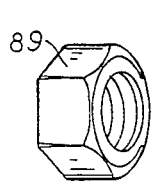
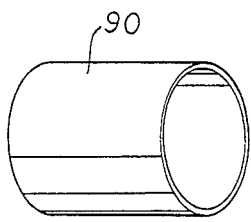

ADJUSTABLE FLOW REGULATING VALVE

BACKGROUND OF THE INVENTION

1. Field of the Invention

This invention relates generally to fluid flow control devices, and more particularly to an adjustable flow regulating valve having an automatic gradually variable effective flow controlling orifice with the range of variation being manually adjustable.

2. Brief Description of the Prior Art

Conventional liquid beverage dispensing machines, such as coffee makers and soft drink machines, are typically connected to the water supply line of the building in which they reside. The water supply pressure will often vary due to other demands on the water supply either outside or inside of the building. Most dispensing machines of this type utilize a predetermined mixture of water and other ingredients such as coffee grounds or syrup concentrate to produce the final consumable product. Excessive variations in the water pressure adversely affects the quality of the beverage produced due to an incorrect water mixture.

Flow control valves are known which are intended to provide a controlled or regulated flow rate regardless of changes in the inlet pressure. In general, these valves are rather complex and are not easily installed or replaced in a fluid system. Valves of this type must be removed for cleaning or replacement due to the components becoming unworkable because of calcium and other mineral deposits. Some flow control valves are not easily adjustable. In some cases, minimal adjustment of the regulated flow rate can be achieved by adjusting the spring force on the control element. In most cases, however, when significant changes in the controlled flow rate are desired, the valve assembly must be replaced with one having the desired flow characteristics.

There are several patents which disclose flow control devices of various construction, but do not have the same structural or operational features of the present invention.

Bron, U.S. Pat. No. 4,428,397 and German Patent No. 2,748,055 disclose a flow rate control device comprising a housing with an elastic stretch-able membrane dividing the housing into two chambers with passageways therebetween. When exposed to a fluid pressure differential, the membrane will stretch between a position closer to the outlet port to restrict the flow or away from the outlet port to increase the flow rate.

Andresen, U.S. Pat. No. 3,419,038 discloses a flow controller comprising a housing with a flexible resilient diaphragm which is creased and supported on a wire member to allow flow through a central hole and around its rim. Excess pressure flattens the diaphragm to close off flow around its rim which then passes through the central hole.

Takahashi et al, U.S. Pat. No. 4,648,424 discloses a liquid flow rate controller comprising a casing with a sliding cup-shaped valve body having a hole at the upstream end which is urged upstream by a spring. Excess pressure moves the valve body downsteam onto a needle to restrict the flow. The distance between the needle and the valve body hole is adjustable.

Boyce, U.S. Pat. No. 4,669,495 discloses an adjustable flow regulating valve comprising a spool slidably mounted within a step bore in the valve body the spool carries a stem with a tapered end which moves in and out of an orifice in the spool to adjust the effective orifice size.

Segelhorst et al, U.S. Pat. No. 2,829,674 discloses an automatic fluid control device comprising a housing with several openings around a small tube running through the center which is surrounded by a flexible resilient plug having a central hole. When the pressure is not excessive, fluid flows through the openings, the central hole, and the tube. Excessive pressure flattens the plug around the tube to close off flow through the central hole allowing reduced flow primarily through the tube only.

Allen, U.S. Pat. No. 2,938,538 discloses a flow regulating valve wherein fluid flows through one or more fixed orifices in a cone disk spring defining one wall of a reference chamber, into a pressure chamber, then through a regulating orifice and out through a discharge port. A valve plunger on the cone disk coacts with the regulating orifice to control the orifice area and the fluid flow through the valve.

The present invention is distinguished over the prior art in general, and these patents in particular by an adjustable flow regulating valve having a flexible apertured diaphragm which coacts with a fixed conical needle to provide a gradually variable effective flow controlling orifice area to compensate for changes in a supply fluid pressure. As the supply fluid pressure changes, the aperture of the flexible diaphragm moves relative to the apex of the needle to reduce or increase the effective orifice area which determines the regulative flow rate. The position of the diaphragm aperture relative to the needle is manually adjustable by rotating an adjustment collar on the valve housing to vary the amount of movement of the diaphragm required to engage the aperture with the valve needle. The diaphragm may also be carried by a spring balanced inner sleeve which allows relative sliding movement between the flexible diaphragm and the needle. The amount of force required for engagement is determined by the strength of compression springs at each end of the sliding sleeve set by the adjustment collar. Varying the spring resistance varies the amount of pressure required to engage the tapered surface with the diaphragm aperture.

SUMMARY OF THE INVENTION

It is therefore an object of the present invention to provide an adjustable flow regulating valve having an automatic gradually variable effective flow controlling orifice in which the range of variation is manually adjustable.

It is another object of this invention to provide an adjustable flow regulating valve having an apertured diaphragm which coacts with a conical needle to provide a gradually variable effective flow controlling orifice to compensate for changes in the supply fluid pressure.

Another object of this invention is to provide an adjustable flow regulating valve having a variable flow controlling orifice carried by a spring balanced inner sleeve whereby the amount of force required for altering the effective orifice area is determined by the spring resistance which may be manually adjusted.

Another object of this invention is to provide a self cleaning adjustable flow regulating valve having a flexible apertured diaphragm which reduces formation of mineral deposits and may be manuall engaged with a conical needle to break mineral deposits loose by manually flexing the diaphragm.

A further object of this invention is to provide an adjustable flow regulating valve which automatically compensates for fluctuating supply fluid pressures to provide a constant fluid flow output to devices requiring a predetermined desirable fluid flow rate.

A still further object of this invention is to provide an adjustable flow regulating valve which is simple in construction, economical to manufacture, and rugged and reliable in use.

Other objects of the invention will become apparent from time to time throughout the specification and claims as hereinafter related.

The above noted objects and other objects of the invention are accomplished by the present adjustable flow regulating valve having a flexible apertured diaphragm which coacts with a fixed conical needle to provide a gradually variable effective flow controlling orifice area to compensate for changes in a supply fluid pressure. As the supply fluid pressure changes, the aperture of the flexible diaphragm moves relative to the apex of the needle to reduce or increase the effective orifice area which determines the regulative flow rate. The position of the diaphragm aperture relative to the needle is manually adjustable by rotating an adjustment collar on the valve housing to vary the amount of movement of the diaphragm required to engage the aperture with the valve needle. The diaphragm may also be carried by a spring balanced inner sleeve which allows relative sliding movement between the flexible diaphragm and the needle. The amount of force required for engagement s determined by the strength of compression springs at each end of the sliding sleeve set by the adjustment collar. Varying the spring resistance varies the amount of pressure required to engage the tapered surface with the diaphragm aperture.

BRIEF DESCRIPTION OF THE DRAWINGS

FIG. 1 is a longitudinal cross section of one embodiment of an adjustable flow regulating valve in accordance with the present invention.

FIG. 2 is a transverse cross section of the valve of FIG. 1, taken along line 2—2 showing the needle support member.

FIG. 3 is a transverse cross section of the valve of FIG. 1, taken along line 3—3 showing the diaphragm member.

FIG. 4 is a longitudinal cross section of another embodiment of an adjustable flow regulating valve having a sliding sleeve in accordance with the present invention.

FIG. 5 is a transverse cross section of the valve of FIG. 4, taken along line 5—5 showing the sliding sleeve connection.

FIG. 6 is a longitudinal cross section of another embodiment of an adjustable flow regulating valve having spring biased sliding sleeve in accordance with the present invention.

FIG. 7 is an end view of the valve of FIG. 6, taken along line 7—7.

FIG. 8 is an isometric view of a lock nut to be used with the regulating valve.

FIG. 9 is an isometric view of a spacer to be used with the regulating valve.

DESCRIPTION OF THE PREFERRED EMBODIMENTS

Referring to the drawings by numerals of reference, there is shown in FIG. 1, a preferred fluid flow regulating valve 10. The valve 10 omprises a generally cylindrical housing 11 with internal threads 12 at one end (the outlet end) and external threads 13 at the other end. A central bore 14 extends inwardly from the externally threaded end and terminates in a reduced bore 15 defining a shoulder 16 therebetween. between.

A triangular spider 17 is secured within the housing 11 adjacent the shoulder 16 by conventional means such as a snap ring 18 and spans the reduced bore 15. A conical needle 19 is secured at its base to triangular support member 17 and extends axially inside cylindrical housing 11 with its apex terminating near externally threaded end 13. Needle 19 and transverse triangular spider 17 are configured to allow fluid to flow therearound and through the reduced bore 15.

A threaded adjustment collar 20 has an outer skirt 21 at one end with internal threads 22 which is threadedly received on the external threads 13 of the housing 11 and has a tubular inner skirt portion 23 spaced concentrically inwardly therefrom which extends slidably along the interior wall of the housing bore 14. The other end of the collar 20 has internal threads 24 (the inlet end). The collar 22 is threadedly adjustable longitudinally relative to the housing 11.

One or more relief passages 25 may extend radially through the side wall of outer skirt 21 at its juncture with the inner skirt 23 to prevent air from becoming trapped in the annulus between the inner skirt and outer skirt as the adjustment collar 20 is rotated on the housing. The exterior surface of housing 11 at the internally threaded end 12 (outlet) and the outer surface of the outer skirt 21 of the adjustment collar 20 may be hexagonal or have wrench flats for rotating the two members relative to each other with standard wrenches.

One or more O-ring seals 26 are installed on the exterior of the tubular inner skirt 23 and form a fluid sealing relation with the interior wall of the housing bore 14 to prevent fluid leakage at the threaded connection between the housing 11 and the adjustment collar 20.

A disk-like flexible washer or diaphragm 27 having a central aperture 28 in alignment with the apex of the needle 19 is secured within an annular recess 29 of the inner skirt portion 23 of the adjustment collar 20 adjacent the internal threads 24 (the inlet end). The diaphragm 27 moves with the adjustment collar 20 relative to the conical needle 19. The diaphragm 27 may be formed with a concave surface 30 on the downstream side whereby the outer periphery of the diaphragm is thicker in coss section than the center portion to increase its flexibility while providing a thicker outer rim for maintaining the diaphragm in the annular recess 29. The diaphragm aperture or orifice 28 is a small circular hole which may also be provided with lateral openings or relief grooves 31 to prevent complete flow shut-off and damage from excessive pressure inside the housing 11.

As the supply fluid pressure changes, the diaphragm moves elastically into and out of engagement on the tapered surface of the needle to reduce or increase the effective orifice size. The effective orifice size determines the regulative flow rate. The amount of movement required for engagement is determined by the position of the diaphragm relative to the needle which is set by the adjustment collar.

ANOTHER EMBODIMENT

A second embodiment of a preferred fluid flow regulating valve 32 is shown in FIGS. 4 and 5. The valve 32 comprises a generally cylindrical housing 33 having internal threads 34 at one end (the outlet end) and external threads 35 at the other end. The externally threaded end 35 of the housing 33 has an inwardly extending hexagonal recess 36 and a central bore 37 extends inwardly therefrom and terminates in a reduced bore 38 defining a shoulder 39 therebetween.

A sliding sleeve member 40 having an external hexagonal end 41 and a tubular portion 42 extending therefrom is slidably received within the interior of the housing 33. The hexagonal portion 41 is received in the recess 36 and the tubular portion 42 is received within the bore 37. The hexagonal connection allows longitudinal movement while preventing rotational movement of the sliding sleeve 40 relative to the housing 33. The sliding sleeve 40 has a central bore 43 provided with internal threads 44 at one end (the inlet end) and an annular recess 45 at the opposite end.

A threaded adjustment collar 46 has internal threads 47 which extend inwardly from one end and terminate in a reduced diameter bore 48 at the opposite end defining a shoulder 49 therebetween. The adjustment collar 46 is threadedly received on the external threads 35 of the housing 33. The collar 46 is threadedly adjustable longitudinally relative to the housing 33. An O-ring seal 50 is installed on the exterior of the sliding sleeve tubular portion 42 to form a sealing relation with the housing bore 37 to prevent fluid leakage through the hexagonal connection (36 and 41) between the housing 33 and sliding sleeve 40.

A transverse triangular spider 51 is retained within the housing 33 adjacent the reduced bore 38 by a compression spring 52 which is captured between the support member 51 and the inward end of the sliding sleeve 40. A conical needle 53 is secured at its base to the triangular spider 51 and extends centrally inside the cylindrical housing 33. The needle 53 and transverse triangular spider 51 are configured to allow fluid to flow therearound.

A disk-like flexible diaphragm 54 having a central aperture 55 in alignment with the apex of the needle 53 is secured within the annular recess 45 near the inward end of the sliding sleve 40 and moves with the sliding sleeve relative to the needle 53. The diaphragm configuration is essentially the same as previously described with reference to FIGS. 1-3, and will not be described to avoid repetition.

The compression spring 52 surrounds the needle 53 and normally urges the sliding sleeve 40 and diaphragm 54 away from the apex of the needle. As the supply fluid pressure changes, the diaphragm 54 moves into and out of engagement on the tapered surface of the needle to reduce or increase the effective orifice size. The effective orifice size determines the regulative flow rate. The amount of movement required for engagement is determined by the initial position of the diaphragm relative to the needle which is set by the adjustment collar 46 and the amount of supply pressure variation required to accomplish the movement is determined by the strength of the spring 52.

The exterior surface of the outlet end of housing and the outer surface of the adjustment collar may be hexagonal or provided with wrench flats for rotating the two members relative to each other with standard wrenches.

A THIRD EMBODIMENT

A third embodiment of a preferred fluid flow regulating valve 60 is shown in FIGS. 6 and 7. The valve 60 comprises a generally cylindrical housing 61 having internal threads 62 at one end (the outlet end) and external threads 63 at the other end. A central bore 64 extends inwardly from the externally threaded end and terminates in a reduced bore 65 defining a shoulder 66 therebetween.

A tubular sliding sleeve member 67 is slidably received within the bore 64 of the housing 61. An O-ring seal 68 is installed on the exterior of the sliding sleeve 67 to form a sealing relation with the central bore 64 of the housing. The sliding sleeve 67 has a central bore 69 extending inwardly from one end and terminating in a reduced diameter bore 70 at its opposite end. An O-ring seal 71 is installed in the reduced bore 70.

An inlet tube member 72 has a radial flanged portion 73, an external hexagonal portion 74 at one end thereof and a reduced diameter tubular extension portion 75 extending from the other end thereof. The tubular portion 75 is slidably received through the reduced bore 70 into the interior of the sliding sleeve 67. The O-ring seal 71 forms a sealing relation with the tubular extension 75. The hexagonal end 74 has internal threads 76 (the inlet end).

A threaded adjustment collar 77 has internal threads 78 which extend inwardly from one end and terminate in a reduced diameter portion 79 which ends in a reduced diameter bore 80 at the opposite end defining a shoulder 81 therebetween. The adjustment collar 77 is threadedly received on the external threads 63 of the housing 61 and the hexagonal end 74 of the inlet tube 72 extends through the bore 80 of the collar. The collar 77 is threadedly adjustable relative to the housing 61. The O-ring seals 68 and 71 prevent fluid leakage through the threaded connection between the housing and collar. The radial flange 73 of inlet tube is engaged on the shoulder 81 of the adjustment collar and allows rotational movement of the inlet tube 72 relative to the collar 77.

A transverse triangular spider 82 is retained within the housing 61 adjacent the reduced bore 65 by compression spring 83 which is captured between the support member 82 and the inward end of the sliding sleeve 67. A conical needle 84 is secured at its base to the triangular spider 82 and extends centrally inside the cylindrical housing 61. The needle 84 and transverse triangular spider 82 are configured to allow fluid to flow therearound.

A disk-like flexible diaphragm 85 having a central aperture 86 in alignment with the apex of the needle 84 is secured within an annular recess 87 near the inward end of the sliding sleeve 67 and moves with the sliding sleeve relative to the needle 84. The diaphragm configuration is essentially the same as previously described with reference to FIGS. 1-3, and will not be described to avoid repetition.

The compression spring 83 surrounds the needle 84 and has one end on the triangular base 82 and its other end on the inward end of the sliding sleeve 67 to normally urge the sliding sleeve away from the apex of the needle 84. A second compression spring 88 surrounds the tubular extension 75 and has one end on the reduced bore end of the sliding sleeve 67 and its other end on the inward surface of the radial flange 73 of the inlet tube 72 to normally urge the sliding sleeve and the inlet tube apart.

As the supply fluid pressure changes, the diaphragm 85 moves into and out of engagement on the tapered surface of the needle to reduce or increase the effective orifice size. The effective orifice size determines the regulative flow rate. The amount of movement required for engagement is determined by the initial position of the diaphragm relative to the needle which is determined by the difference in the strength of the springs 83 and 88 which are compressed by the adjustment collar 77 and the amount of supply pressure variation required to accomplish the movement is determined by the strength of the spring 83. The spring strength may be altered by substituting springs of various strength and/or by compressing the springs by turning the adjustment collar.

The exterior surface of the outlet end of housing 61 and the outer surface of the adjustment collar 77 may be hexagonal or provided with wrench flats for rotating the housing and inlet tube relative to each other with standard wrenches.

As shown in dotted line in FIG. 6, a lock nut 89 (FIG. 8) may be installed on the externally threaded portion 63 of the housing 61 and tightened against the end of the adjustment collar 77 to secure the collar in a fixed adjusted position and prevent maladjustment from the collar from becoming accidentally unscrewed or loosened.

One or more cylindrical spacers 90 (FIG. 9) of various lengths corresponding to predetermined fixed flow rates may also be provided which can be slidably installed within the valve between the externally threaded end of the housing 61 and the radial flange portion 73 of the inlet tube 72. Spacers may also be installed externally over the threaded portion 63 of the housing between the hexagonal end of the housing and the inward end of the collar. The spacers would allow the adjustment collar to be screwed onto the housing until it is stopped by the spacer.

OPERATION

In the following discussion, as one typical example, the flow regulating valve is described as being installed in a water supply line to a vending machine, however it should be understood that the valve may be used in various other applications.

The valve is installed with the inlet end upstream in a water supply line supplying a beverage vending machine, such as a soft drink machine or coffee maker. The adjusting collar is rotated to set the initial position of the diaphragm relative to the apex of the needle to provide a constant flow through the valve. The flow rate is determined at the time of installation by conventional flow meters.

After installation, if the water pressure fluctuates, the apertured diaphragm flexes relative to the apex of the needle to provide a variable effective fluid flow orifice. An increase in pressure will move the diaphragm toward the needle to reduce the effective orifice area and a decrease in pressure will move the diaphragm away from the needle to increase the effective orifice area. The effective orifice area determines the regulative flow rate and a substantially constant fluid flow through the outlet end is provided. The flexure of the diaphragm aids in preventing calcium and other mineral deposits from building up on the diaphragm, thus making the device relatively self cleaning and reduces the tendency to collect calcium deposits. The diaphragm can be manually tightened against the needle to flex the elastomeric material and break mineral deposits loose.

In the second described embodiment of the invention the diaphragm is carried by a spring biased inner sleeve which allows relative sliding movement between the flexible diaphragm and the needle. The compression spring surrounding the needle normally urges the sliding sleeve and diaphragm away from the apex of the needle. As the supply fluid pressure changes, the diaphragm flexes and moves relative to the apex of the needle to reduce or increase the effective orifice size. The amount of movement is determined by the initial position of the diaphragm relative to the needle which is set by the adjustment collar and the amount of supply pressure variation required to accomplish the movement is determined by the strength of the compression spring. The spring strength may be altered by substituting springs of various strength and/or by compressing the spring by turning the adjustment collar.

In the third described embodiment, a sliding sleeve is biased by a first compression spring on its down stream end and a second compression spring on its upstream end. As described above, the flexure and movement of the diaphragm relative to the apex of the needle changes the effective orifice area. The amount of movement is determined by the initial position of the diaphragm relative to the needle and by the difference in the strength of the springs and which are compressed by the adjustment collar. The amount of supply pressure variation required to accomplish the movement is determined by the strength of the downstream spring. The differential spring strength may be altered by substituting springs of various strength and/or by compressing the springs by turning the adjustment collar.

A lock nut may be installed on the flow regulating valve housing and tightened against the end of the adjustment collar to secure the collar in a fixed adjusted position and prevent maladjustment from the collar from becoming accidentally unscrewed or loosened. One or more cylindrical spacers of various lengths corresponding to predetermined fixed flow rates may also be provided which can be slidably installed within the valve to set the collar in a fixed adjusted position. Spacers may also be installed externally on the housing which allow the adjustment collar to be screwed onto the housing until it is stopped by the spacer.

While this invention has been described fully and completely with special emphasis upon several preferred embodiments, it should be understood that within the scope of the appended claims the invention may be practiced otherwise than as specifically described herein.

I claim:

1. An adjustable fluid flow regulating valve comprising;
   a hollow housing with an inlet end and an outlet end and a central bore through which a regulated fluid flow is discharged,
   said inlet and outlet ends adapted to be connected in a fluid supply line between a fluid supply source and a device to be supplied with a regulated fluid flow,
   a conical needle fixed axially within said central bore with a flow passage therearound to allow fluid flow through said outlet end and having its apex facing upstream toward said inlet end, a flexible diaphragm supported in said central bore spaced from and having a central aperture in axial alignment with the apex of said conical needle, said diaphragm being elastically movable relative to the apex of said needle whereby changes in the supply fluid pressure causes the aperture of said diaphragm to coact with the apex of said needle to reduce or increase the effective fluid flow orifice area therebetween to provide a substantially constant regulated fluid flow rate through said outlet bore to the device being supplied, and means for adjusting the amount of movement of said diaphragm required to coact with said needle, said diaphragm adjusting means being operatively connected at the inlet end of said housing and longitudinally movable relative thereto, said diaphragm being operatively coupled to said adjustment means and operable thereby, and said adjustment means being movable to adjustably position said flexible diaphragm relative to the apex of said needle whereby changes in the supply fluid pressure causes the aperture of said diaphragm to coact with the apex of said needle to reduce or increase the effective fluid flow orifice area therebetween to provide a substantially constant regulated fluid flow rate through said outlet bore to the device being supplied.

2. An adjustable fluid flow regulating valve according to claim 1 in which;

said adjustment means is movable to place said diaphragm in an initial stationary position with said aperture axially aligned with the apex of said needle, and said diaphragm flexes relative to the apex of said needle upon changes in the supply fluid pressure to reduce or increase the effective fluid flow orifice area between said apex and said aperture to provide a substantially constant regulated flow rate.

3. An adjustable fluid flow regulating valve according to claim 2 in which;

said adjustment means comprises a collar threadedly connected on the inlet end of said housing and longitudinally movable relative thereto by manual rotation to position said diaphragm adjustably relative to the apex of said needle.

4. An adjustable fluid flow regulating valve according to claim 3 in which;

rotation of said collar in one direction decreases the relative position between said diaphragm and said apex sufficient to allow said diaphragm aperture to engage the tapered needle surface with a small amount of relative movement or minimal pressure fluctuation, and rotation of said collar in the opposite direction increases the relative position sufficient to require a larger amount of relative movement or greater pressure fluctuation to engage said diaphragm aperture on the needle surface.

5. An adjustable fluid flow regulating valve according to claim 4 in which;

said flexible diaphragm comprises a disk-shaped member having a central portion which is thinner in cross section than its outer periphery to provide increased flexibility.

6. An adjustable fluid flow regulating valve according to claim 4 in which;

said flexible diaphragm aperture comprises a generally circular hole trrough the central portion with relief openings extending radially therefrom to prevent complete flow shut-off therethrough as said aperture engages the tapered needle surface.

7. An adjustable fluid flow regulating valve according to claim 3 including;

the exterior surfaces of said housing and said collar are configured to receive conventional wrenches for rotating the two members relative to each other.

8. An adjustable fluid flow regulating valve according to claim 3 including;

a tubular inner sleeve element slidably received within said housing central bore and operatively coupled to said collar for longitudinal movement relative to the apex of said conical needle upon rotation of said collar and having a central bore in fluid communication with said housing inlet end, and said diaphragm mounted at one end of said inner sleeve bore.

9. An adjustable fluid flow regulating valve according to claim 8 including;

seal means between said inner skirt portion and said housing central bore to form a fluid sealing relation therebetween for preventing fluid leakage at the threaded connection between said housing and said collar.

10. An adjustable fluid flow regulating valve according to claim 9 in which;

said tubular inner sleeve element is integral with said collar and moves rotationally and longitudinally therewith.

11. An adjustable fluid flow regulating valve according to claim 10 in which;

said cylindrical housing outlet end is internally threaded and said inlet end is externally threaded, said collar threadedly connected at one end on the inlet end of said housing and its other end is adapted to be connected in fluid communication with the fluid supply source, said tubular inner sleeve element integral with said collar is defined by a tubular inner skirt extension thereof which is slidably received within the central bore of said housing.

12. An adjustable fluid flow regulating valve according to claim 11 including;

one or more relief passages in said collar communicating the annulus between the inner skirt extension and the externally threaded end of said housing to prevent air from becoming trapped in the annulus as said collar is rotated on the housing.

13. An adjustable fluid flow regulating valve according to claim 9 including;

a compression spring surrounding said conical needle within said housing and having one end engaged on the base of said conical needle and its other end engaged on one end of said tubular inner sleeve element, and the other end of said tubular inner sleeve element is spring biased into engagement on said collar, whereby said inner sleeve element is operatively coupled to said collar and said conical needle is fixed axially within said housing bore by the spring force.

14. An adjustable fluid flow regulating valve according to claim 13 in which;

said tubular inner sleeve central bore is adapted at the end opposite said diaphragm to be connected in fluid communication with the fluid supply source and has an external raised polygonal portion on same said end, said housing has an internal inwardly extending polygonal recess at the externally threaded end which slidably receives said inner sleeve polygonal portion to allow longitudinal movement thereof while preventing rotational movement of said inner sleeve relative to said housing as said collar is rotated.

15. An adjustable fluid flow regulating valve according to claim 9 including;

a tubular inner sleeve element slidably received within said housing central bore and having a central bore terminating in a reduced bore at one end, said diaphragm mounted at one end of said inner sleeve central bore opposite said reduced bore, an inlet tube member having a central bore in fluid communication with the fluid supply source and its exterior having a radial flanged portion slidably received within said collar, a first reduced diameter portion extending therefrom through said collar, and a second reduced diameter tubular extension extending from said flanged portion slidably received within said inner sleeve through the reduced bore portion and terminating adjacent said diaphragm, said inlet tube first reduced diameter portion extending through said collar adapted to be connected in fluid communication with the fluid supply source, a first compression spring surrounding said conical needle within said housing and having one end engaged on the base of said conical needle and its other end engaged on one end of said tubular inner sleeve element, and a second compression spring surrounding said inlet tube member extension within said housing and having one end engaged on one end of inner sleeve element and its other end engaged on said inlet tube radial flange portion, whereby said inlet tube radial flange is biased on said collar for longitudinal movement therewith, said conical needle is fixed axially within said housing bore, said inner sleeve element is slidably mounted on said inlet tube for longitudinal movement relative thereto, and said diaphragm is resiliently positioned relative to the apex of said conical needle by the combined force of said springs, and rotation of said collar in one direction decreases the combined spring force sufficient to allow said diaphragm aperture to engage the tapered needle surface with a small amount of pressure fluctuation and rotation of said collar in the opposite direction increases combined spring force sufficient to require a greater pressure fluctuation to engage said diaphragm aperture on the needle surface.

16. An adjustable fluid flow regulating valve according to claim 15 in which;

said first and second compression springs at each end of said sliding sleeve are of different strengths, and rotation of said collar in one direction decreases the relative position between said diaphragm and said apex sufficient to allow said diaphragm aperture to engage the tapered needle surface with a small amount of relative movement or minimal pressure fluctuation, and rotation of said collar in the opposite direction increases the relative position sufficient to require a larger amount of relative movement or greater pressure fluctuation to engage said diaphragm aperture on the needle surface.

17. An adjustable fluid flow regulating valve according to claim 15 including seal means between said inner skirt reduced bore and said portion and said inlet tube tubular extension to form a fluid sealing relation therebetween for preventing fluid leakage therebetween.

18. An adjustable fluid flow regulating valve according to claim 15 in which the exterior surfaces of said housing and said inlet tube first reduced diameter portion extending through said collar are configured to receive conventional wrenches for rotating the two members relative to each other.

19. An adjustable fluid flow regulating valve according to claim 15 including lock means operatively received on the externally threaded portion of said housing to releasably engage said collar to secure said collar in a fixed adjusted position and prevent maladjustment from the collar from becoming accidentally unscrewed or loosened.

20. An adjustable fluid flow regulating valve according to claim 15 including one or more cylindrical spacer members of predetermined length corresponding to fixed flow rates which may to be slidably received within said collar between the externally threaded end of said housing and the radial flange portion of said inlet tube which allow said collar to be screwed onto said housing until it is stopped by said spacer.

* * * * *